(12) United States Patent
Kelly et al.

(10) Patent No.: US 11,066,231 B2
(45) Date of Patent: Jul. 20, 2021

(54) BEVERAGE PREPARATION CAPSULES

(75) Inventors: David Kelly, Roslin (GB); Paul Fletcher, Basingstoke (GB)

(73) Assignee: Lavazza Professional North America, LLC, West Chester, PA (US)

( * ) Notice: Subject to any disclaimer, the term of this patent is extended or adjusted under 35 U.S.C. 154(b) by 0 days.

(21) Appl. No.: 14/131,654

(22) PCT Filed: Jul. 11, 2012

(86) PCT No.: PCT/GB2012/051643
§ 371 (c)(1),
(2), (4) Date: Apr. 4, 2014

(87) PCT Pub. No.: WO2013/008012
PCT Pub. Date: Jan. 17, 2013

(65) Prior Publication Data
US 2014/0220191 A1    Aug. 7, 2014

(30) Foreign Application Priority Data
Jul. 13, 2011 (GB) ..................... 1112058

(51) Int. Cl.
 *B65D 85/804* (2006.01)
 *A23F 3/18* (2006.01)
 *A23F 5/26* (2006.01)

(52) U.S. Cl.
 CPC ............ *B65D 85/8043* (2013.01); *A23F 3/18* (2013.01); *A23F 5/262* (2013.01); *B65D 85/8061* (2020.05); *B65D 2565/385* (2013.01)

(58) Field of Classification Search
 CPC .............. B65D 85/804; B65D 85/8043; B65D 85/8046; B65D 85/8049; B65D 85/8052;
(Continued)

(56) References Cited

U.S. PATENT DOCUMENTS 2,968,560 A * 1/1961 Goros ................... A23F 5/267
                                                99/295
4,801,464 A * 1/1989 Hubbard, Jr. ......... B65B 29/028
                                                426/79
(Continued)

FOREIGN PATENT DOCUMENTS

DE           2341187         2/1974
DE        102009041633      6/2011
(Continued)

OTHER PUBLICATIONS

International Search Report dated Mar. 6, 2013, during examination of International Application No. PCT/GB2012/051643.
(Continued)

*Primary Examiner* — Drew E Becker
*Assistant Examiner* — Bryan Kim
(74) *Attorney, Agent, or Firm* — The Belles Group PC (57) ABSTRACT

A sealed beverage preparation capsule includes a sealed hollow body having a top and a bottom, a beverage preparation ingredient inside the body and a layer of filter material at least about 2 mm thick located inside the body and abutting said bottom of said body. A kit is also provided for assembling a plurality of beverage preparation capsules. The capsules include a cup-shaped base having a bottom, and side walls extending from the base to an upper rim defining an open top of the base component, and a plurality of ingredient pods. Each ingredient pod includes a top, side walls and a bottom, each formed of sheet material, wherein the pod contains a beverage preparation ingredient. The ingredient pod is shaped and configured to be engaged with the base component to assemble a beverage making capsule, with the top of the pod forming a lid for the base component and the bottom of the ingredient pod spaced from the bottom of the base inside the base.

17 Claims, 4 Drawing Sheets

(58) Field of Classification Search
CPC ............ B65D 85/8055; B65D 85/8067; B65D 85/8061; A23F 3/18; A23F 5/262; A23F 3/16; A23F 5/24; A47J 31/407
USPC ..... 426/77, 78, 84, 112, 115, 106, 394, 425, 426/432, 433, 435
See application file for complete search history.

(56) References Cited

U.S. PATENT DOCUMENTS

| | | | |
|---|---|---|---|
| 5,325,765 A | | 7/1994 | Sylvan et al. |
| 5,656,311 A | * | 8/1997 | Fond .................... B65B 29/022 426/84 |
| 5,840,189 A | | 11/1998 | Sylvan et al. |
| 5,897,899 A | * | 4/1999 | Fond .................... A47J 31/0678 426/112 |
| 6,832,542 B2 | * | 12/2004 | Hu ....................... A47J 31/0668 99/295 |
| 6,849,285 B2 | * | 2/2005 | Masek ................ B65D 85/8043 426/112 |
| 6,869,627 B2 | * | 3/2005 | Perkovic ............ B65D 85/8043 206/0.5 |
| 8,307,754 B2 | * | 11/2012 | Ternite ................ A47J 31/0673 99/280 |
| 8,322,271 B2 | * | 12/2012 | Glucksman ........ B65D 85/8043 99/282 |
| 8,443,717 B2 | * | 5/2013 | Venturi .............. B65D 85/8043 99/295 |
| 2002/0088807 A1 | | 7/2002 | Perkovic et al. |
| 2003/0172813 A1 | * | 9/2003 | Schifferle ........... A47J 31/0673 99/275 |
| 2005/0172822 A1 | * | 8/2005 | Macchi ............... A47J 31/3695 99/295 |
| 2006/0280841 A1 | * | 12/2006 | Cai ......................... A47J 31/14 426/77 |
| 2008/0299262 A1 | * | 12/2008 | Reati ................................ 426/84 |
| 2009/0205504 A1 | * | 8/2009 | Navarro Alcantara ...................... B65D 77/0486 99/295 |
| 2010/0239717 A1 | | 9/2010 | Yoakim et al. |
| 2010/0239733 A1 | * | 9/2010 | Yoakim et al. ................ 426/431 |
| 2010/0288131 A1 | * | 11/2010 | Kilber ................. A47J 31/0673 99/295 |
| 2011/0064852 A1 | * | 3/2011 | Mann .................. B65D 85/8043 426/78 |
| 2012/0070551 A1 | * | 3/2012 | Mahlich ............. B65D 85/8043 426/433 |

FOREIGN PATENT DOCUMENTS

| | | |
|---|---|---|
| DE | 102011012881 | 3/2012 |
| EP | 0179641 A2 | 4/1986 |
| EP | 0272922 A2 | 6/1988 |
| EP | 0468079 A1 | 1/1992 |
| EP | 0512468 A1 | 11/1992 |
| EP | 0821906 A1 | 2/1998 |
| EP | 1529739 A1 | 5/2005 |
| EP | 1775234 A1 | 4/2007 |
| EP | 2230195 A1 | 9/2010 |
| FR | 2556323 A1 | 6/1985 |
| GB | 1402799 | 8/1975 |
| JP | 2010-530257 A | 9/2010 |
| WO | 1994001344 A1 | 1/1994 |
| WO | 2001060219 A1 | 8/2001 |
| WO | 2001060712 A1 | 8/2001 |
| WO | 2002019875 A1 | 3/2002 |
| WO | 2002082963 A1 | 10/2002 |
| WO | 2005026018 A1 | 3/2005 |
| WO | 2006/111807 A1 | 10/2006 |
| WO | WO 2008-011913 | 1/2008 |
| WO | 2012/123106 A1 | 9/2012 |

OTHER PUBLICATIONS

Notice of Opposition from Kruger GmbH & Co. KG.
Written Opinion of the Opposition Division for Application No. 12743201.1, dated Nov. 11, 2018.

* cited by examiner

BEVERAGE PREPARATION CAPSULES

CROSS-REFERENCE TO RELATED APPLICATIONS

This Application is a national stage of PCT/GB2012/051643 filed Jul. 11, 2012 claiming priority to GB 1112058.1 filed Jul. 13, 2011.

TECHNICAL FIELD

The present invention relates to improved capsules containing beverage preparation ingredients for the preparation of beverages in dispensing equipment by injection of water into the capsules.

BACKGROUND OF THE INVENTION

A number of beverage making systems are known in which the beverage is made by inserting a capsule containing a particulate beverage making ingredient, such as ground coffee, into a beverage making station of a beverage making apparatus. The apparatus then injects water into the capsule, where the beverage making ingredient dissolves in, or infuses into, the water to form the beverage. The beverage flows out of the capsule through a suitable outlet, which may be simply an opening or perforation in the capsule, or it may comprise an outlet tube that pierces an outlet region of the capsule. The capsule may incorporate a filter to prevent passage of solid components such as coffee grounds out of the capsule. Beverage making systems of this general type are described for example in WO94/01344, EP-A-0512468 and EP-A-0468079 (all Nestle), in EP-A-0272922 (Kenco), in EP-A-0821906 (Sara Lee) and in EP-A-0179641 and WO02/19875 (Mars).

FR-A-2556323 describes a capsule for the preparation of drinks, in particular such as coffee, tea and other infusions, that includes an impermeable, yieldably pierceable, frusto-conical base having an open, flanged top and a closed, yieldably piercable bottom. A beverage making ingredient such as ground roasted coffee is provided in the capsule, and the top of the capsule is covered in a sealed manner at its top by a piercable cover and closed at its bottom by a filter sheet. The filter sheet may be profiled to provide a liquid outflow chamber in the bottom of the capsule. In use, the top of the capsule is pierced by a water injection tube, and the bottom of the capsule below the filter sheet is pierced by a beverage extraction tube.

U.S. Pat. Nos. 5,840,189 and 5,325,765 describe further beverage capsules of the above type. A self-supporting wettable filter element is disposed in the base and is permanently sealed to an interior surface of the base, near the top of the base or at the top rim of the base. The filter element subdivides the base into first and second chambers, an upper chamber for storing the beverage making ingredient such as ground coffee, and a lower empty chamber for accessing the beverage after the beverage outflow from the filter has been made by combining a liquid with the ingredient. An impermeable, yieldably pierceable, imperforate cover is sealingly engaged with the top of the base to form an impermeable cartridge.

Beverage making capsules of the above type have found widespread use. However, they suffer from certain drawbacks. The manufacture of these capsules requires assembly of appropriately shaped base, filter and lid in precise and secure manner. The rate of flow of the beverage through the ingredient and/or the filter sheet may not be as fast and/or as uniform as would be desirable for optimum beverage preparation. A difficulty that can arise with the above systems is incomplete dissolution or extraction of the beverage ingredients inside the capsule, for example due to channeling of water through the bed of ingredient inside the capsule. Another difficulty that can arise is excessive system backpressure due to blocking of the filter by the particulate ingredient inside the capsule. In addition the filter sheet can become relatively weak when wet, and can burst unless structural elements are provided to support the filter sheet during beverage preparation. Finally, the capsules require a significant quantity of packaging material and are difficult to recycle, since recycling requires separation of the spent beverage ingredient (e.g. coffee grounds) from the plastic components before recycling.

Several patent applications address one or more of the above technical problems.

WO-A-02082963 describes a beverage capsule of the above type that can be disassembled and refilled for multiple uses.

WO-A-2005026018 describes a beverage capsule of the above type in which the filter element has a flat base and fluted sides to improve flow of liquid through the filter and the beverage ingredient.

EP-A-1529739 describes a beverage capsule of the above type that eliminates the impermeable base portion. The capsule has a rigid top and a flexible, pouch-like body formed of filter material with regions of higher liquid permeability and lower liquid permeability to optimise flow of liquid through the pack.

WO-A-0160712 and WO-A-01060219 describe beverage capsules of the above type wherein the base side wall is provided with circumferentially spaced reinforcing flutes or ledges which are positioned to enhance resistance of the cartridge to buckling when the outlet nozzle is inserted into the base of the cartridge and/or to support the filter sheet during beverage preparation.

BRIEF SUMMARY OF THE INVENTION

In a first aspect, the present invention provides a sealed beverage preparation capsule comprising:
a sealed hollow body having a top and a bottom;
a beverage preparation ingredient inside said body; and
a layer of filter material at least about 2 mm thick located inside said body and abutting said bottom of said body.

In use, a water injection tube is inserted into the body through a nozzle in the capsule, or by piercing a wall of the capsule, and water is injected into the beverage preparation ingredient inside the capsule to prepare the beverage or beverage component. A water outlet tube is inserted into the body through the bottom of the capsule, for example by piercing the bottom of the capsule, such that the opening of the outlet tube resides just below, or inside, the layer of filter material. The filtered beverage then escapes through the outlet tube. The filter material is supported by the bottom of the capsule, whereby the problem of bursting filter sheets is avoided. Moreover, the capsules are easy to assemble simply by placing or gluing the layer of filter material into the bottom of the capsule. Finally, the overall size of the capsule required for a given amount of ingredient is reduced since the whole volume of the capsule can be filled with the ingredient and the filter layer.

The products according to this aspect of the invention are sealed capsules. That is to say, they enclose the beverage preparation ingredient in substantially air-tight fashion to maintain the freshness of the ingredient before use. Suitably, the capsules are also substantially moisture-impermeable before use.

Typically, each capsule comprises at least one sheet of plastic and/or metal foil material. The sheet may be semi-rigid, e.g. thermoformed or injection molded, or it may be a flexible film material. The sheet or flexible film material may be a laminate comprising at least one of the following layers: a thermoplastic sealant layer for bonding the sheet to other members of the package; a substantially gas-impermeable barrier layer, which suitably is a metal film such as aluminum film; adhesion layers to improve adhesion between other layers of the laminate; structural layers, for example to provide puncture resistance; and/or a printing substrate layer. The structural layers could be made of polyolefins, polystyrene, polyester, nylons, or other polymers as is well known in the art.

In one group of embodiments, the capsule may comprise two similar or identical sheets of flexible film material bonded together around a margin to form a film sachet or capsule, for example a capsule having a lenticular shape. In another group of embodiments the capsules may comprise a first sheet that has been formed, e.g. by thermoforming, into a cup or bowl shape with a flanged rim, and a second sheet that is bonded across the flanged rim to form the capsule. For example, the first sheet may be a relatively stiff thermoplastic sheet that has been thermoformed into a cup or bowl shape with a flanged rim, and the second sheet is a flat sheet, which may be of flexible film material, that is bonded across the flanged rim. In these embodiments, the capsule may have a frustoconical shape, suitably with a piercable top and base. The bottom of the capsule is pierceable or otherwise provided with means for insertion of an outlet tube into the filter layer, for example a hole with a removable cover or a hinged cover, or a septum, or a split septum, or a nozzle with a frangible freshness barrier for example as described in WO-A-0219875.

The dimensions of the capsules may be similar to those used in the existing systems described above so that the capsules of the invention can be used in existing beverage preparation equipment without modification of the equipment.

The filter layer is applied to at least a region of the bottom of the capsule, in particular adjacent to the location where outlet tube is inserted into the capsule. The terms "top" and "bottom" herein are relative terms denoting the locations, respectively, where the water inlet and water outlet of the capsule are located. The filter layer is relatively thick, and abuts the inside surface of the capsule, whereby the inserted outlet tube projects into, but not all the way through the filter layer. The thickness of the filter layer is suitably from about 2 mm to about 20 mm, for example from about 3 mm to about 15 mm, typically from about 5 mm to about 10 mm. The filter layer may suitably be secured to the inside surface of the capsule body by an adhesive, or in other embodiments it may be held in place by retaining flanges on the inside of the capsule body, or it may even be retained by a liquid-permeable sheet extending over the filter layer and bonded to an internal surface of the capsule body around the periphery of the filter layer. The area of the filter layer is suitably from about 1 cm$^2$ to about 20 cm$^2$, for example from about 2 cm$^2$ to about 10 cm$^2$.

Suitable materials for forming the filter layer are water-insoluble but preferably hydrophilic, food-acceptable materials. For example, they may comprise a liquid permeable foam material such as a polyurethane foam or an open-cell polyolefin foam. More suitably, the matrix comprises or consists essentially of fibers of substantially water-insoluble material, for example a woven or nonwoven fabric. The fibers making up the matrix may be any suitable food-acceptable fibers such as cellulose fibers, polyolefin fibers or nylon fibers.

In certain embodiments, the filter layer may comprise or consist essentially of a compostable material. The term "compostable" signifies that the material is substantially broken down within a few months, preferably within a few weeks, when it is composted. Typically, the material is at least about 90% composted within six months, as determined by the method of ISO14855, as in EN13432. Thermoplastic compostable polymers that could be used for the matrix filter include polymers and copolymers of lactic acid and glycolic acid, polyhydroxybutyrates, polyvinyl alcohols (PVOH), ethylene vinyl alcohols (EVOH), starch derivatives, cellulose and cellulose derivatives, and mixtures thereof.

Suitably, the filter layer comprises or consists essentially of one or more nonwoven textile webs or bodies. That is to say, a fibrous web or body characterized by entanglement or point bonding of the fibers. The nonwoven web or body may, for example, comprise or consist essentially of a web prepared by conventional techniques such as air laying, carding, needling, melt-blowing, or spun-bond processes, or combinations of two or more of such processes. The integrity of the web may be increased by melt-bonding of the fibers, for example achieved by the melt-blowing method or by thermal bonding of thennoplastic (e.g. bicomponent) fibers.

In certain embodiments the beverage ingredient is a particulate, extractable beverage ingredient such as leaf tea or ground coffee. Alternatively or additionally the beverage ingredient may comprise a particulate, soluble beverage ingredient such as a particulate whitener, hot chocolate, sweetener, flavouring agent, coloring agent or fortifying agent.

Suitably, the capsule contains sufficient beverage preparation ingredients for the preparation of a single portion of beverage, i.e. from about 25 to about 500 ml, preferably from about 100 ml to about 250 ml of beverage. For example, the capsule may contain from about 2 g to about 25 g of ground coffee or from about 1 g to about 9 g of leaf tea. The internal volume of the capsule is suitably from about 1 cm$^3$ to about 100 cm$^3$, for example from about 5 cm$^3$ to about 50 cm$^3$.

In a second aspect, the present invention provides a kit for assembling a plurality of beverage preparation capsules, comprising:

a cup-shaped base having a bottom, and side walls extending from said base to an upper rim defining an open top of said base component;

a plurality of ingredient pods, each said ingredient pod comprising a top, side walls and a bottom, each formed of sheet material, wherein the pod contains a beverage preparation ingredient, wherein the ingredient pod is shaped and configured to be engaged with the base component with the top of said pod forming a lid for the base component and the bottom of the ingredient pod spaced from the bottom of the base inside the base.

The kits according to this aspect of the invention permit assembly of a plurality of capsules, for example capsules containing different beverage making ingredients, by combining different pods with a single base. The pods are demountable from the base after use, whereby the base can either be re-used, or it may be recycled, thereby reducing the total amount of packaging waste. The pods are relatively compact, and the bases can suitably be stacked in nested stacks, thereby reducing the total volume occupied by a given number of capsules during transport and storage. A further advantage of these kits over conventional pre-assembled piercable capsules is that the base can be provided with a pre-pierced bottom, e.g. with a hole already provided for the liquid outlet tube, thereby reducing the force required to insert the outlet tube during beverage preparation and allowing the base to be made from thinner sheet material than for the pre-assembled capsules which require a minimum strength to withstand the piercing force without distortion.

The materials of the base component and of the beverage pod lid are as described hereinbefore in relation to the first aspect of the invention. Likewise, the types and amounts of the beverage preparation ingredient are suitably as described hereinbefore in relation to the first aspect of the invention.

Suitably, the side walls of the base component and the lid of the pod component are provided with complementary engagement elements to secure the lid to the pod. Suitable elements are complementary projections or recesses, for example threads, bayonet fittings or snap-fitting elements. Suitably, the engagement elements are releasable to permit disassembly of the capsules into the pod and the base after beverage preparation. Therefore, suitably the capsules are not formed by adhesive or melt bonding of the pod to the base.

At least a region of the bottom and/or the side walls of the pod may be made of a liquid permeable material, which functions as a filter for the beverage produced by injecting water through the lid of the pod. In these embodiments, the pod is suitably packaged in an air- and moisture-impermeable package such as a sachet to maintain freshness of the beverage ingredient before assembly of the capsule.

In other embodiments, the bottom and side walls of the pod are formed from air- and moisture-impermeable material as hereinbefore described so as to maintain freshness of the beverage ingredient before use. In these embodiments, the pod comprises an outlet that is opened before or during beverage preparation to release the beverage formed inside the pod. For example, the outlet may be an opening in the pod that is sealed by a cover sheet adhered to the pod by a pressure-sensitive adhesive. The cover sheet is removed and discarded immediately prior to assembling the capsule. Alternatively, the sheet material of the pod may be provided with a line of weakness, e.g. a die-cut line of weakness, defining an opening, for example a C-shaped or U-shaped line of weakness. The user presses down on the sheet material to open the pod along the line of weakness immediately before assembling the capsule. In yet other embodiments the opening is sealed by a flap that is adhered around the opening by an adhesive that is releasable by heat or pressure inside the pod arising from injection of hot water into the pod.

In these embodiments a layer of filter material may be provided inside the pod covering the outlet so as to filter the beverage before it escapes from the pod. No such filter may be necessary for pods that contain fully soluble/dispersible ingredients such as milk, concentrated liquid milk, chocolate, etc.

In a further aspect, the present invention provides a method of preparing a beverage, comprising the step of passing an aqueous liquid through a beverage preparation capsule according to the present invention. The aqueous liquid is usually water, for example at a temperature of 85° C. to 99° C. The method may be performed in the beverage preparation apparatus already known for use with existing capsule formats, for example as described in the patent references listed above, without modification of the apparatus. The method suitably comprises piercing the top of the capsule with a water inlet tube and piercing the bottom of the capsule with a beverage outlet tube.

BRIEF DESCRIPTION OF THE DRAWINGS

Specific embodiments of the present invention will now be described further, by way of example, with reference to the accompanying drawings, in which.

DETAILED DESCRIPTION OF THE INVENTION

Figure 1:
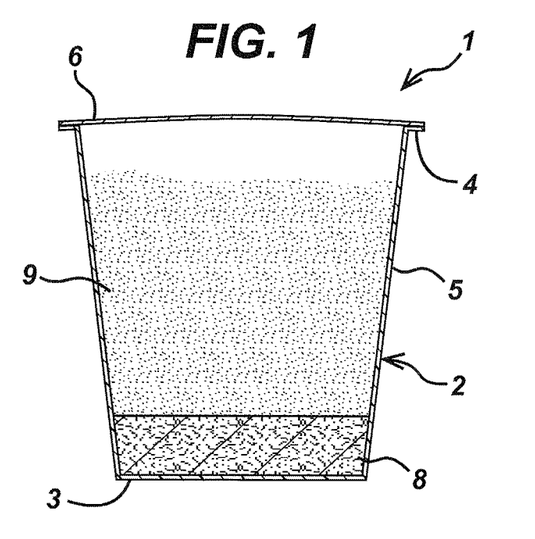
FIG. 1 shows a cross-sectional view through a first beverage preparation capsule according to the invention.

Referring to FIG. 1, the beverage preparation capsule 1 comprises a cup element 2 having a substantially flat base 3, a flanged top 4, and frustoconical side walls 5 extending from the base to the top 4. The cup element is formed for example by thermoforming from a suitable thermoplastic for example polystyrene. The thickness and material of the cup element are selected so that the cup element has sufficient rigidity to allow piercing of the base during beverage preparation, as described below, without collapse of the cup. The flanged top 4 of the cup is sealed with a flexible film lid 6 of a suitable laminate sheet material as hereinbefore described. The lid 6 is bonded to the lip 4 by melt bonding or adhesive bonding in conventional fashion. A layer 8 of nonwoven textile filter material is provided inside the capsule 1 adjacent to the flat base 3. The layer 8 is approximately 10 mm thick, and may be bonded to the base 3 by a suitable water-insoluble adhesive (not shown). The beverage brewing ingredient 9, which in this embodiment is ground coffee is deposited on top of the filter layer 8 inside the capsule 1. In the exemplified embodiment, the beverage brewing ingredient 9 does not entirely fill the inside of the capsule 1, and thus a portion of the inside of the capsule 1 which is between the beverage ingredient 9 and the top end 4 is an empty space.

Figure 2:
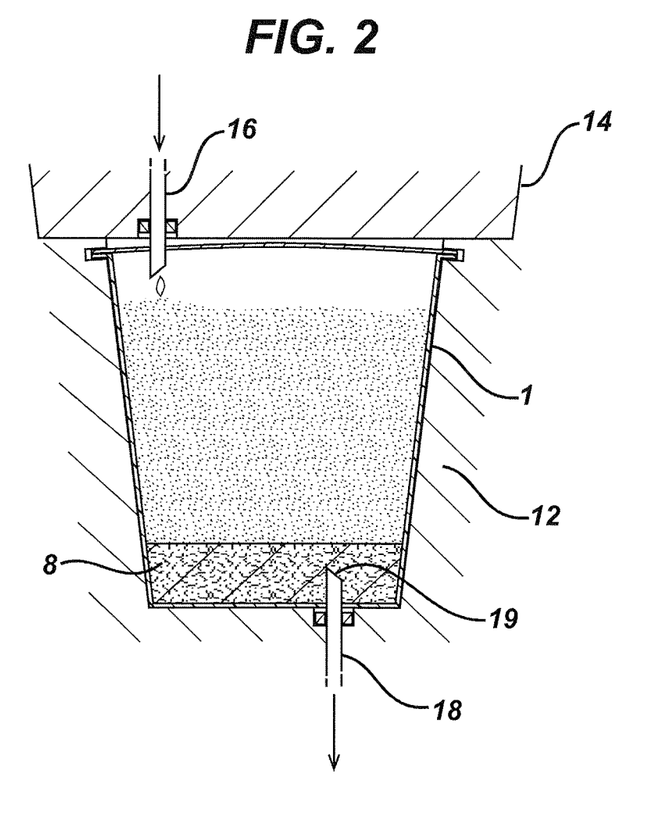
FIG. 2 shows a schematic cross-sectional view through the capsule of FIG. 1 being used to prepare a beverage.

In use, the capsule 1 is held inside a clamp of a beverage making apparatus as shown in FIG. 2. The clamp has a lower part 12 with a recess for mating engagement with the cup element 2 of the capsule, and an upper damp part 14 that is movable to abut the lid of the capsule. In this embodiment the capsule is completely enclosed by the clamp during beverage preparation, which permits the use of elevated pressures during beverage preparation without bursting the capsule. It is a further advantage of the present invention that high water injection pressures can be used because there is no risk of bursting a filter sheet. In other embodiments, the capsule may be merely gripped by a clamp but not fully enclosed thereby, or the flange 4 may simply be supported by an annular collar of the apparatus. The beverage preparation apparatus comprises a source of water (not shown), suitably a source of hot water, for supplying water to an injection tube 16 that pierces the lid of the capsule to inject water into the capsule for preparation of the beverage. The beverage preparation apparatus further comprises an outlet tube 18 that pierces the base of the capsule and projects a short distance into the capsule, whereby the open end 19 of the outlet tube is located entirely inside the filter layer 8, The inlet and outlet tubes may be in fixed spatial relationship to the respective clamp parts, in which case the piercing of the capsule takes place when the clamp is closed around the capsule. Alternatively, the inlet and outlet tubes may be associated with mechanisms to provide reciprocating motion of the respective tubes into the capsule after the capsule has been clamped, and out of the capsule after beverage preparation is complete. It will be appreciated that more than one inlet and/or outlet tube may be provided if appropriate.

It can be seen that the capsule 1 according to this embodiment of the invention is extremely simple and inexpensive to manufacture, and can be adapted to capsules for use in any existing beverage preparation equipment that uses beverage capsules that are pierced by an outlet tube. Problems arising from the use of conventional thin-sheet filters, such as bursting of the filter and excessive back pressure, are avoided. A further advantage is that the volume occupied by the filter layer of the capsule 1 is quite small, which allows either a larger charge of beverage making ingredient for a capsule of given size than in prior capsules, or better fluidization of the beverage making ingredient if the amount of beverage ingredient is not increased.

Figure 3:
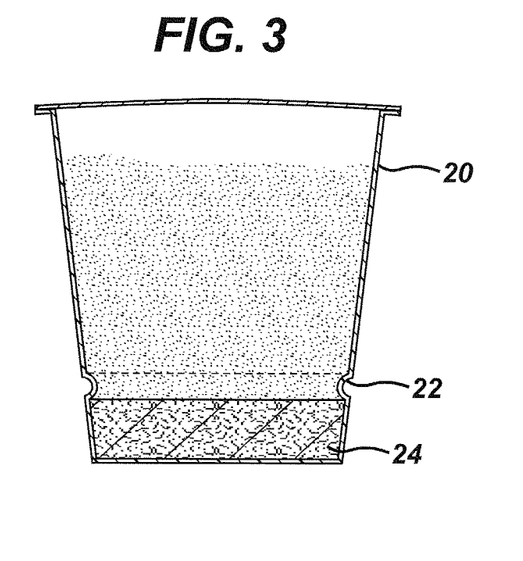
FIG. 3 shows a cross-sectional view through a second beverage preparation capsule 30 according to the invention.

Referring to FIG. 3, this embodiment is substantially similar to that of FIG. 1. The sole difference is that the cup element 20 of the embodiment of FIG. 3 is provided with a circumferential indentation 22 for retaining the filter pad 24 in the base of the cup.

Figures 4, 4A:
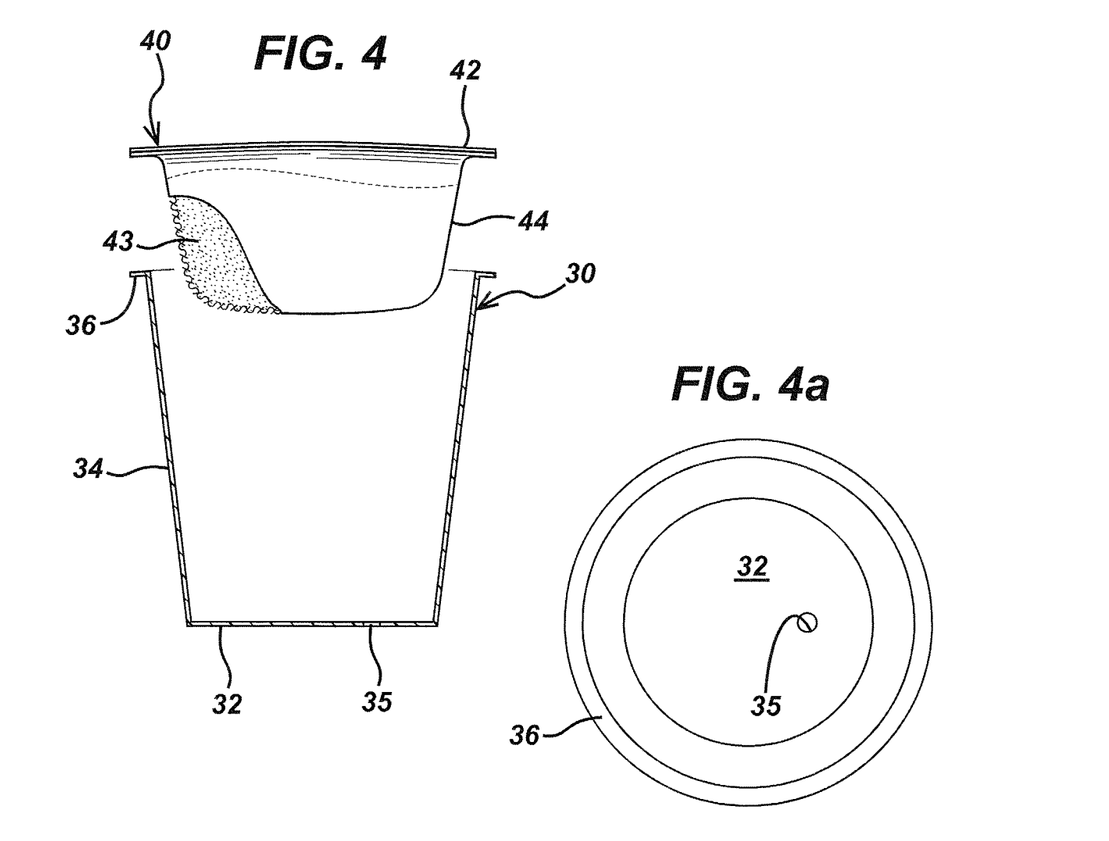
FIG. 4 shows a cross-sectional view through a pod and cup element of a first kit according to the present invention.
FIG. 4a shows a top plan view of the cup element of FIG. 4.

Referring to FIG. 4, the kit according to this embodiment comprises a cup element 30 and a separate pod 40. The cup element comprises a bottom 32, and a frustoconical side wall 34 terminating in an open flanged top 36. The material of the cup element 30 may be the same as for the embodiment of FIGS. 1-3. The material of the cup element may advantageously be made of a thermoplastic that can be recycled or that is compostable. In embodiments where the cup element 30 is intended for multiple use, the cup element may be made of a thicker plastic, or even of metal.

In this embodiment, the base 32 of the cup element is provided with a hole 35 for receiving an outlet tube of a beverage preparation apparatus. This removes the need for piercing of the base 32 during beverage preparation, since an outlet tube can simply be inserted through the hole 35. In embodiments wherein the cup element is intended to be disposable (including recycling or composting), this allows the cup element may have thinner walls than for the embodiment of FIGS. 1-3, because it is no longer necessary to sustain a piercing force to insert the outlet tube. It can be seen that, in this embodiment, the hole 35 is offset from the center of the base 32 for use with beverage preparation machines having a similarly offset outlet tube in the clamp. In these embodiments, therefore, it is desirable for the cup element to be provided with indicia, or preferably with one or more circumferential projections or recesses for engagement with complementary projections or recesses on the clamp, to ensure correct orientation of the base 32 over the outlet tube during beverage preparation.

Suitably, a plurality of the cup elements 30 can be stacked in a nested stack, thereby reducing the total volume taken up in packaging and storage.

The pod 40 in this embodiment comprises a lid element 42 similar to the lid element of the embodiments of FIGS. 1-3. A bowl-shaped filter sheet 44 of conventional filter sheet material is bonded around the periphery of the lid element 42 to define, with the lid, an enclosed pod cavity that contains the beverage preparation ingredient 43. The pod may be provided in sealed packaging to preserve freshness, for example in a sachet or bag made from air- and moisture-impermeable sheet material. The pods 40 may be individually packaged in this way, or multiple pods may be sealed in one package.

Figure 5:
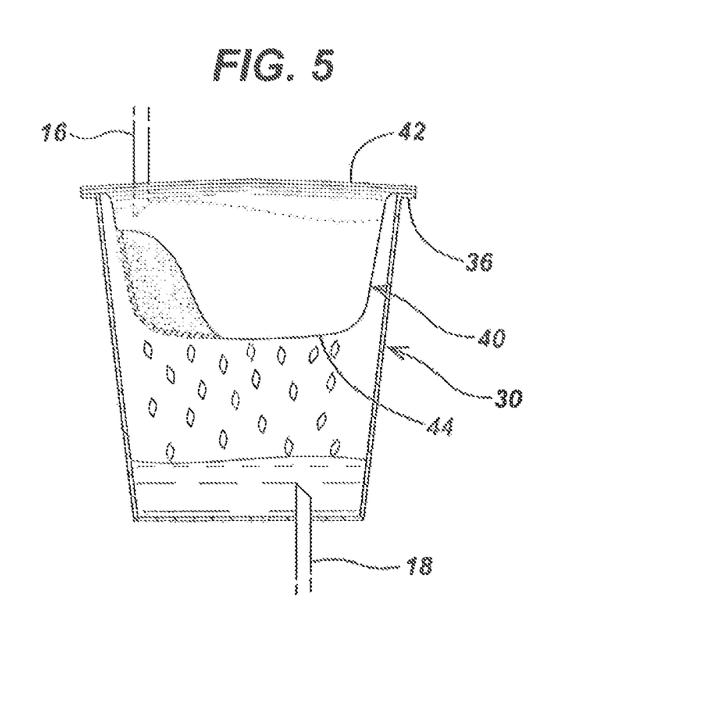
FIG. 5 shows a beverage preparation capsule assembled from the kit elements of FIG. 4 being used to prepare a beverage.

Referring to FIG. 5, the kit of FIG. 4 is assembled into a beverage preparation capsule by inserting the pod 40 into the cup element so that the lid 42 of the pod abuts the lip 36 of the cup element 30 as shown. The beverage is then prepared from the capsule in a clamp as described in relation to FIG. 2. Assembly of the capsule may be performed by inserting the cup element 30 into the recess in the bottom clamp part of the beverage preparation apparatus, followed by inserting the pod 40 into the cup element 30, and closing the clamp, whereby the clamp holds the cup and pod together during the beverage preparation. Alternatively, the capsule may be assembled prior to insertion into the clamp, in which case it can be advantageous to have adhesive or snap-fitting elements to hold the cup and pod together for insertion into the clamp. The resulting capsule is used to prepare a beverage in a clamp as for FIG. 2, as shown schematically in FIG. 5. The water is injected through the lid 42 into the pod 40 by means of injector tube 16, and the beverage escapes through the filter wall 44 of the pod into the cup element, from where it is collected by the outlet tube 18.

Figure 6:
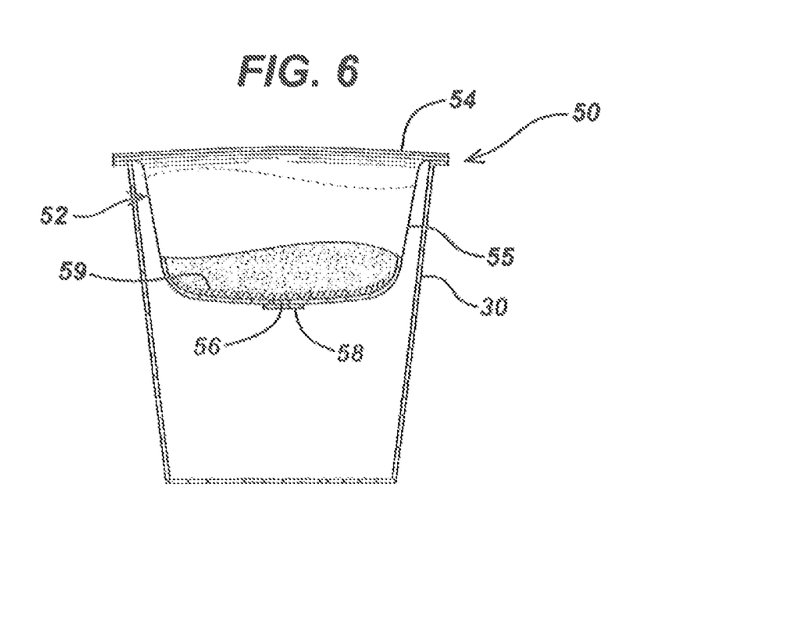
FIG. 6 shows a cross-sectional view through a beverage preparation capsule assembled from a pod and cup element of a second kit according to the present invention.

Referring to FIG. 6, the capsule 50 shown in the drawing is assembled from a kit comprising a cup element 30 as for the embodiment of FIG. 4, and a pod 52. The pod 52 comprises a lid 54 as for the embodiment of FIG. 4 and a bowl 55 formed of a liquid impermeable sheet material that is sealed around the periphery of the lid 54 to form a sealed pod cavity containing the beverage ingredient. A hole 56 in the bottom of the bowl portion 54 is sealed by a removable flap 58 of air- and liquid-impermeable material. A layer of filter sheet material 59 is bonded to the inside surface of the bowl covering the hole 56. The flap 58 is attached to the outside surface of the bowl around the hole 56 by adhesive to form an air- and liquid-tight seal. The pods according to this embodiment are completely sealed and do not require secondary packaging to preserve freshness of the ingredient.

Figure 7:
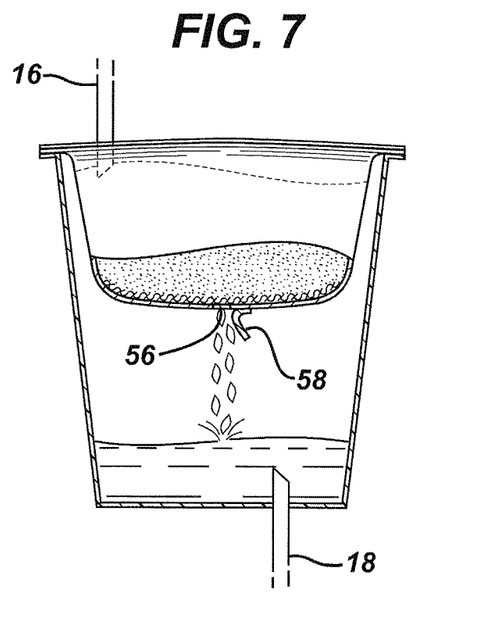
FIG. 7 shows a schematic cross-sectional view through the beverage preparation capsule of FIG. 6 being used to prepare a beverage.

In use, a beverage is prepared from the kit of FIG. 6 as shown in FIG. 7. A capsule is assembled in similar fashion as for the embodiment of FIGS. 4-5. In certain embodiments the cover flap 58 is peeled from the pod before assembly of the capsule. In other embodiments, the cover flap 58 is attached to the pod by a heat-releasable adhesive, whereby the flap opens automatically when hot water is injected into the pod. Alternatively or additionally, the flap may open automatically as a result of pressure inside the pod due to injection of water into the pod.

Figure 8:
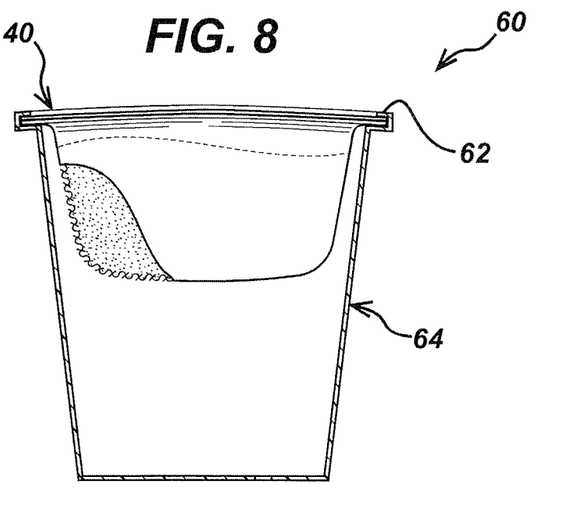
FIG. 8 shows a beverage capsule assembled from a third embodiment of the kit according to the present invention.

Referring to FIG. 8, the capsule 60 assembled from the kit according to this embodiment has snap-fitting elements 62 around the circumference of the lip of the cup element 64 for retaining the pod 40 as described in FIG. 4 on the lip following assembly of the capsule from 60 the cup element 64 and the pod 40.

The kits according to the invention comprise at least one cup element and at least two pods. The at least two pods may contain different beverage preparation ingredients. For example, a first pod may contain ground coffee or leaf tea, and a second pod may contain a beverage whitener or powdered chocolate drink composition. In certain embodiments, the cup element may be intended for multiple use with a plurality of pods. These embodiments result in improved sustainability, less waste, and less materials required for a given number of beverage servings. In other embodiments, the cup element may be intended for disposal or recycling after a single use. These embodiments still require less packaging, because the plurality of cup elements can be stored as a nested stack. Moreover, the cup element can be formed of a plastic suitable for recycling, and can readily be separated from the pod for recycling after use. The pods are more difficult to recycle because they contain the beverage ingredient residue. However, the total amount of packaging material used for the pods is quite small. Suitably, the pods are made essentially or completely from compostable materials so that they can be composted with the beverage ingredient residue.

Any feature that has been described above in relation to any one aspect or embodiment of the invention is also disclosed hereby in relation to all other aspects and embodiments. Likewise, all combinations of two or more of the individual features or elements described above may be present in any aspect or embodiment. For brevity, all possible features and combinations have not been recited in relation to all aspects and embodiments, but they are expressly contemplated and hereby disclosed.

The above embodiments have been described by way of example only. Many other embodiments falling within the scope of the accompanying claims will be apparent to the skilled reader.

What is claimed is:

1. A sealed beverage preparation capsule comprising:
   a hollow body comprising:
      a cup-shaped base portion comprising a bottom wall and a sidewall extending from the bottom wall to a flanged top, an upper surface of the bottom wall and an inner surface of the sidewall collectively defining a cavity of said hollow body, said cavity having an open top end; and
      a top cover sheet bonded to the flanged top and closing the open top end of the cavity to seal the hollow body;
   a layer of filter material at least 2 mm thick located inside said cavity of said hollow body in abutment with said upper surface of said bottom wall of said base portion of said hollow body by at least one of an adhesive or a retaining bead on the inner surface of the sidewall of the base portion of the hollow body, wherein substantially all of the upper surface of the bottom wall of said base portion of said hollow body is in direct contact with said layer of filter material;
   a beverage preparation ingredient inside said cavity of said hollow body on the layer of filter material and covering an upper surface of said layer of filter material, the beverage preparation ingredient having a top surface that faces the top cover sheet; and
   wherein the cavity comprises a continuous and uninterrupted volume of space between the top surface of the beverage preparation ingredient and the top cover sheet.

2. The sealed beverage preparation capsule according to claim 1, wherein the filter material is supported by the bottom wall of said base portion of said hollow body.

3. The sealed beverage preparation capsule according to claim 1, wherein the upper surface of the bottom wall is planar.

4. The sealed beverage preparation capsule according to claim 1, wherein said hollow body is substantially frusto-conical in shape.

5. The sealed beverage preparation capsule according to claim 1, wherein said layer of filter material is from 5 mm to 10 mm thick.

6. The beverage preparation capsule according to claim 1, containing from 2 g to 25 g of ground coffee or from 1 g to 9 g of leaf tea.

7. The sealed beverage preparation capsule according to claim 1 wherein the layer of filter material is 10 mm thick.

8. The sealed beverage preparation capsule according to claim 1 wherein the sealed hollow body comprises an axis that intersects the bottom wall and the top cover sheet, wherein the layer of filter material entirely fills a lower axial portion of the cavity, the beverage preparation ingredient entirely fills a middle axial portion of the cavity, and wherein an upper axial portion of the cavity located between a top surface of the beverage ingredient and the top cover sheet is empty.

9. The sealed beverage preparation capsule according to claim 8 wherein the layer of filter material is in contact with the inner surface of the sidewall along an entire periphery of the layer of filter material, and wherein the beverage preparation ingredient is in contact with the inner surface of the sidewall along an entire periphery of the beverage preparation ingredient.

10. A sealed beverage preparation capsule comprising:
   a sealed hollow body having a top end, a bottom wall having a planar upper surface, and a continuous side wall extending from the planar upper surface of the bottom wall to the top end;
   a beverage preparation ingredient inside said sealed hollow body;
   a layer of filter material having a thickness of 10 mm located inside said sealed hollow body and abutting the planar upper surface of said bottom wall of said sealed hollow body, wherein the layer of filter material consists essentially of one or more nonwoven textile webs or bodies; wherein the sealed hollow body defines a cavity comprising a continuous and uninterrupted volume of space between a top surface of the beverage preparation ingredient and the top end of the sealed hollow body;
   wherein said layer of filter material is retained in abutment with said upper surface of said bottom wall of said sealed hollow body and bonded to said bottom wall by a water insoluble adhesive, wherein an entirety of the upper surface of the bottom wall is in direct contact with the layer of filter material;
   wherein the capsule is sealed such that said capsule is substantially air tight and substantially moisture impermeable before use;
   wherein the continuous side wall is integral with the bottom wall;

wherein the bottom wall extends uninterruptedly from the continuous side wall to a center point of the bottom wall located inwardly of the continuous side wall; and wherein the bottom wall has a substantially uniform thickness.

11. The sealed beverage preparation capsule according to claim 10, wherein said sealed hollow body is substantially frustoconical in shape.

12. The sealed beverage preparation capsule according to claim 10 further comprising a circumferential indentation on an outer surface of said continuous sidewall that forms a circumferential protuberance on the inner surface of the continuous side wall of the sealed hollow body for retaining the filter material in the body, the circumferential protuberance being a portion of the sidewall which protrudes inwardly towards an axis of the sealed hollow body, wherein an entirety of the circumferential protuberance is positioned between an upper surface of said layer of filter material and the top end of the sealed hollow body such that a lowermost edge of the circumferential protuberance abuts the upper surface of the layer of filter material to retain the layer of filter material in position.

13. The sealed beverage preparation capsule according to claim 10 wherein the layer of filter material is in surface contact with the upper surface of the bottom wall and a portion of the inner surface of the continuous side wall that is adjacent to the bottom wall.

14. The sealed beverage preparation capsule according to claim 10 wherein said beverage preparation ingredient is located atop of an upper surface of said layer of filter material to cover an entirety of said upper surface of said layer of filter material.

15. The sealed beverage preparation capsule according to claim 14 wherein the sealed hollow body defines a cavity comprising an axis that intersects the bottom wall, the layer of filter material, and the beverage preparation ingredient, wherein the layer of filter material entirely fills a lower axial portion of the cavity, the beverage preparation ingredient entirely fills a middle axial portion of the cavity, and wherein an upper axial portion of the cavity located between a top surface of the beverage ingredient and the top end of the sealed hollow body is empty space.

16. A sealed beverage preparation capsule comprising:
a sealed hollow body comprising:
a cup-shaped base portion comprising a bottom wall and a sidewall extending from the bottom wall to a top end, an upper surface of the bottom wall and an inner surface of the sidewall collectively defining a cavity of said sealed hollow body, said cavity having an open top end; and
a top cover sheet bonded to the top end of the sidewall and closing the open top end of the cavity;
a layer of filter material at least 2 mm thick located inside said cavity of said sealed hollow body and abutting the upper surface of the bottom wall of said cup-shaped base portion so that an entirety of the upper surface of the bottom wall is covered by the layer of filter material;
a beverage preparation ingredient positioned on the layer of filter material and covering an entirety of an upper surface of said layer of filter material; and
wherein an upper portion of the cavity located between an upper surface of the beverage preparation ingredient and the top cover sheet is an empty volume of space.

17. The sealed beverage preparation capsule according to claim 16 wherein said layer of filter material is retained in abutment with said upper surface of said bottom wall of said cup-shaped base portion by an adhesive, or by a retaining bead on an inner surface of the cup-shaped body portion of the sealed hollow body.

\* \* \* \* \*